US009630100B2

(12) United States Patent
Condon et al.

(10) Patent No.: US 9,630,100 B2
(45) Date of Patent: *Apr. 25, 2017

(54) WIRELESS COMMUNICATION SYSTEM AND METHOD FOR GAME PLAY WITH MULTIPLE REMOTE-CONTROL FLYING CARPET

(71) Applicant: QFO Labs, Inc., Bloomington, MN (US)

(72) Inventors: John Paul Condon, Minneapolis, MN (US); James Edward Fairman, Bloomington, MN (US); Bradley Dean Pedersen, Minneapolis, MN (US)

(73) Assignee: QFO Labs, Inc., Bloomington, MN (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/691,412

(22) Filed: Apr. 20, 2015

(65) Prior Publication Data

US 2015/0283459 A1 Oct. 8, 2015
US 2016/0228764 A9 Aug. 11, 2016

Related U.S. Application Data

(63) Continuation of application No. 13/843,490, filed on Mar. 15, 2013, now Pat. No. 9,011,250.
(Continued)

(51) Int. Cl.
*A63H 3/00* (2006.01)
*A63F 13/235* (2014.01)
(Continued)

(52) U.S. Cl.
CPC .......... *A63F 13/235* (2014.09); *A63F 13/00* (2013.01); *A63F 13/245* (2014.09);
(Continued)

(58) Field of Classification Search
CPC ...... A63F 13/00; A63F 13/235; A63F 13/245; A63F 13/837; A63F 2009/2489;
(Continued)

(56) References Cited

U.S. PATENT DOCUMENTS

| 2002/0106966 A1* | 8/2002 | Jimenez | A63H 27/004 446/454 |
| 2005/0186884 A1* | 8/2005 | Evans | A63H 17/14 446/456 |
| 2007/0105474 A1* | 5/2007 | Gotou | A63H 27/02 446/37 |

* cited by examiner

*Primary Examiner* — Justin Myhr
(74) *Attorney, Agent, or Firm* — Charles A. Lemaire; Jonathan M. Rixen; Lemaire Patent Law Firm, P.L.L.C.

(57) ABSTRACT

A gaming system for enabling three-dimensional game play of remote-control craft controlled by a controller, each craft including a communication system with both radio frequency (RF) and infrared (IR) capabilities. The system can include a plurality of hovering remote-control flying craft each controlled by a handheld controller, and further may include at least one additional game accessory elements, such as a puck, a ground station or a gun. Each pairing of craft and controllers communicate via an RF protocol that transmits at least control communications between the controller and the craft based on pair identification information in an RF communication protocol. The craft and game-accessory elements also communicate via at least an IR protocol that communicates game-play information. Selectable pairs of craft and controllers may be assigned to different teams for playing multiplayer team games based on team identification information in the RF communication protocol.

20 Claims, 11 Drawing Sheets

Related U.S. Application Data

(60) Provisional application No. 61/710,671, filed on Oct. 5, 2012, provisional application No. 61/710,665, filed on Oct. 5, 2012.

(51) Int. Cl.

| | | |
|---|---|---|
| *G05D 1/00* | (2006.01) | |
| *A63H 27/00* | (2006.01) | |
| *A63H 30/04* | (2006.01) | |
| *A63F 13/245* | (2014.01) | |
| *A63F 13/837* | (2014.01) | |
| *A63F 13/00* | (2014.01) | |
| *A63H 17/00* | (2006.01) | |
| *A63H 17/32* | (2006.01) | |
| *A63H 33/26* | (2006.01) | |
| *F21L 4/02* | (2006.01) | |
| *F21V 23/04* | (2006.01) | |
| *F41G 1/36* | (2006.01) | |

(52) U.S. Cl.
CPC .......... *A63F 13/837* (2014.09); *A63H 17/00* (2013.01); *A63H 17/32* (2013.01); *A63H 27/12* (2013.01); *A63H 30/04* (2013.01); *G05D 1/0033* (2013.01); *A63H 27/00* (2013.01); *A63H 33/26* (2013.01); *A63H 2200/00* (2013.01); *B64C 2201/027* (2013.01); *B64C 2201/042* (2013.01); *B64C 2201/146* (2013.01); *B64C 2203/00* (2013.01); *F21L 4/027* (2013.01); *F21V 23/0435* (2013.01); *F41G 1/36* (2013.01)

(58) Field of Classification Search
CPC ........ A63F 2300/1031; A63F 2300/204; A63F 2300/402; A63H 17/00; A63H 17/32; A63H 2200/00; A63H 27/00; A63H 27/12; A63H 30/04; A63H 33/26; A63H 33/18; A63H 30/02; B64C 2201/146; B64C 2203/00; B64C 39/024; B64C 2201/108; B64C 2201/162; F21L 4/027
See application file for complete search history.

WIRELESS COMMUNICATION SYSTEM AND METHOD FOR GAME PLAY WITH MULTIPLE REMOTE-CONTROL FLYING CARPET

CROSS-REFERENCE TO RELATED APPLICATIONS

This application is a continuation of U.S. patent application Ser. No. 13/843,490 filed Mar. 15, 2013, titled "WIRELESS COMMUNICATION SYSTEM FOR GAME PLAY WITH MULTIPLE REMOTE CONTROL FLYING CRAFT" (which issued as U.S. Pat. No. 9,011,250 on Apr. 21, 2015), which claims benefit of U.S. Provisional Patent Application No. 61/710,671 and U.S. Provisional Patent Application No. 61/710,665, both filed Oct. 5, 2012; each of these applications is incorporated herein by reference in its entirety.

This invention is also related to prior U.S. Design patent application Ser. No. 29/433,939 filed Oct. 5, 2012, titled "Single-Handed Controller for a Remote Control Flying Craft" (which issued as U.S. Design Pat. D691,217 on Oct. 8, 2013); and to U.S. patent application Ser. No. 13/842,525, filed on Mar. 15, 2013 by John Paul Condon et al., titled "Remote-Control Flying Copter and Method" (which issued as U.S. Pat. No. 9,004,973 on Apr. 14, 2015); each of which is incorporated herein by reference in its entirety.

FIELD OF THE INVENTION

The invention relates generally to the field of heavier-than-air aeronautical vehicles that are sustained in air by the force of a fluid such as air. More particularly, the present invention relates to a wireless communication system that can support game play among multiple remote-control flying craft.

BACKGROUND OF THE INVENTION

Remote-control flying vehicles are becoming increasingly popular and sophisticated. While larger craft such as military and civilian drone aircraft have been in use for only the last two decades, smaller radio-controlled flying vehicles built and flown by hobbyists have been around for much longer. Generally, remote-control flying vehicles are either fixed wing, like a plane, or hovering, like a helicopter or quadcopter.

One example of a small, hovering type craft is described in U.S. Pat. No. 7,931,239, titled "Homeostatic Flying Hovercraft," incorporated herein by reference, which describes the use of a homeostatic hover control system in combination with a hand-held controller to cause the craft to mimic the orientation of the controller in terms of yaw, pitch, roll, and lateral flight maneuvers. Another example of a quadcopter is the Parrot AR Drone that utilizes a Wi-Fi connection between the quadcopter and a smart phone or tablet that serves as a tilt-based remote control. Still another example is the Walkera QR Lady Bird mini-quadcopter that is controlled via a conventional dual joystick remote control. These kinds of electronically stabilized hovercraft or quadcopter designs with three or more separate rotors are generally more stable and easier to learn to fly than the single-shaft, dual counter-rotating rotor, model helicopters that may use some form of mechanical gyro stabilization. Like the Lady Bird mini-quadcopter, these less-expensive single-shaft, dual counter-rotating rotor, model helicopters are typically controlled via a conventional dual joystick remote control.

Other types of control systems for remote control have also been described, for example, in U.S. Pat. No. 8,200,375 (describes spring-return control for RF controller for hovering-type remote control craft), and U.S. Pat. No. 8,049,600 (describes spread spectrum RF controller with force feedback for remote control craft, each of which is incorporated herein by reference). While these types of control systems address various issues with RF communications, and can provide additional control feedback for a user, none of these approaches have addressed control problems that are unique to the implementation of multiplayer, multi-team gaming with remote control flying craft. Typically, the above-described devices operate in a proprietary radio frequency (RF) protocol only between the particular controller and the device it controls. It is therefore difficult, if not impossible, to add additional devices. Different frequency or protocol-enabled "A" version and "B" versions must often be purchased.

There is need for a robust and fully-featured wireless communication system that can support game play among multiple remote-control flying craft, as well as other devices and accessories that may be used as part of the game play.

BRIEF SUMMARY OF THE INVENTION

Embodiments of this invention relate to systems and methods for enabling game play of remote-control flying craft controlled by a controller, each craft including a wireless communication system with both radio frequency (RF) and infrared (IR) capabilities. In some embodiments, the system includes a plurality of hovering remote-control flying craft each controlled by a handheld controller, and further may include at least one additional wireless-enabled non-flying game accessory element, such as a puck, a ground station and/or a toy gun. In some embodiments, at least all of the craft and controllers communicate via an RF protocol that transmits at least control communications between a particular pair of the controller and the remote-control flying craft based on a pair identification information contained in the RF communication protocol, and all of the craft and at least one of the additional non-flying game-accessory elements also communicate via at least an IR protocol that communicates game-play information among at least the plurality of remote-control flying craft.

In various embodiments, at least each of the craft may include a color-selectable LED to display a chosen team color. The use of both RF and IR protocols and color-selectable LED displays among the various elements of the game-play system enable support of multi-player, multi-team gaming with the remote-control flying craft. In some embodiments, the team color display is on the top and/or bottom of the craft. In some embodiment, the team color is displayed on the outer protective ring of the craft. In some embodiments, the body of the craft is translucent and the team color lights up the body of the craft. In some embodiments, other methods of displaying the team colors are used. In some other embodiments, one or more the above team-color display methods are used.

In various embodiments, an RF protocol and/or IR protocol are defined to enable the remote-control flying craft, and/or its controller, to interface with other devices, controllers, or accessories. For example, accessories can include a puck accessory, a toy-gun accessory, or a tablet/laptop computer ground station. Numerous flying games are then enabled; for example, Multi-Team Dog Fighting, King of the Hill, Domination, Capture the Flag, Capture the Team, Tag, Elimination, or the even a variation of the Quidditch® game made popular by the Harry Potter series of novels.

In some embodiments, the aforementioned games are integrated with various staged simulated "damage" to the respective hovering remote-control flying craft when hit by another IR transmission. For example, upon first hit, the craft in some embodiments is programmed to wobble in combination with a vibration sent through the controller. Upon second hit, the craft in some embodiments is programmed to have power and performance reduced. Upon third hit, the craft in some embodiments is programmed for a forced landing for a predetermined amount of time, for example, several seconds—depending on the game play.

This description of the invention is not intended to describe each illustrated embodiment or every implementation of the present invention. The figures and the detailed description that follow exemplify some embodiments of the invention.

BRIEF DESCRIPTION OF THE DRAWINGS

The invention may be more completely understood in consideration of the following detailed description of some embodiments of the invention in connection with the accompanying drawings, in which.

Figure 1:
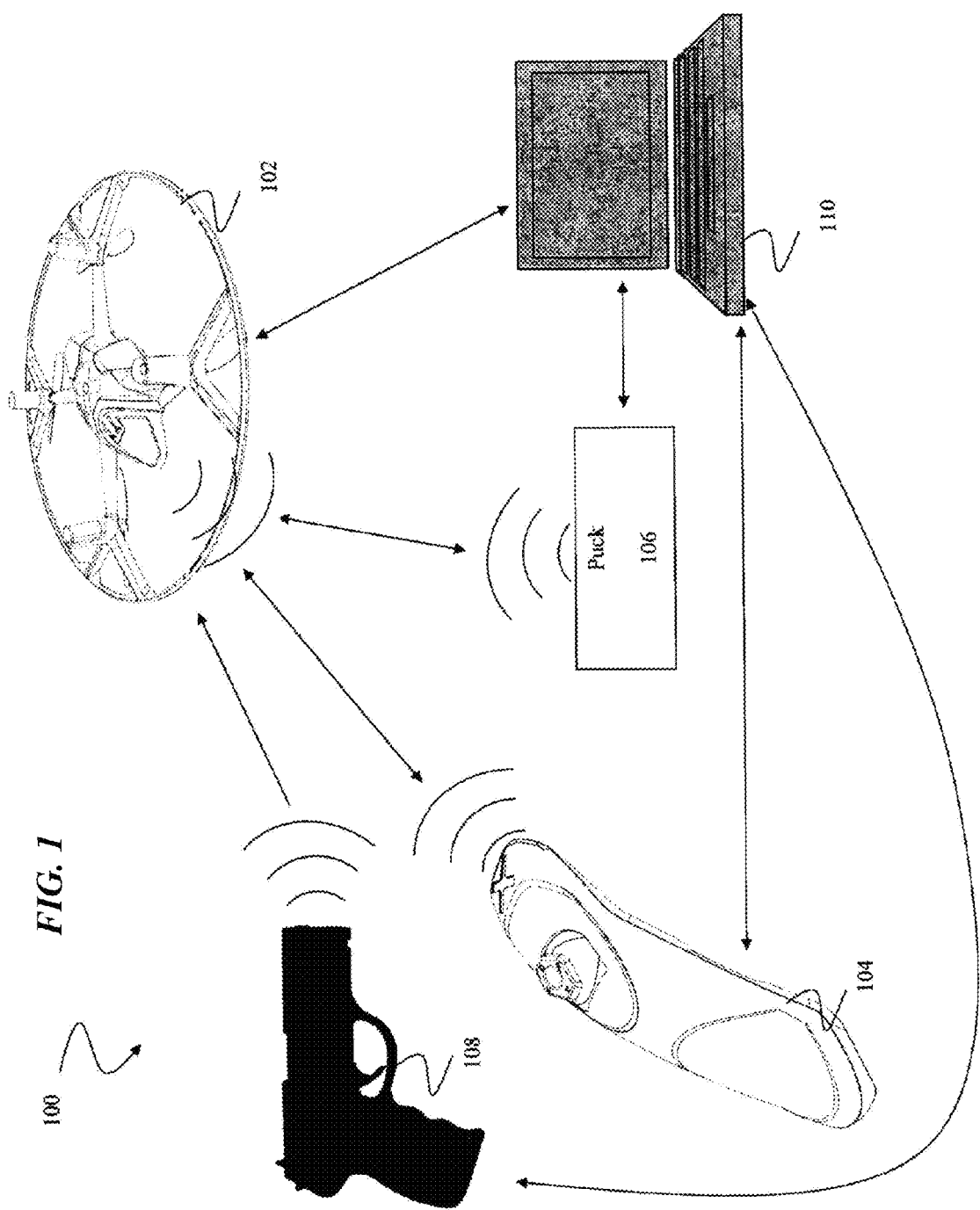
FIG. 1 is a block diagram of a gaming system for a hovering remote-control flying craft and accessories, according to some embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the figures generally corresponds to the figure number in which that component is first introduced, such that the same reference number is used throughout to refer to an identical component which appears in multiple figures. Signals and connections may be referred to by the same reference number or label, and the actual meaning will be clear from its use in the context of the description.

Referring to FIG. 1, a gaming system 100 can include a remote-control flying craft 102, a controller 104 for remote-control flying craft 102, and non-flying game accessories, such as a puck 106, a toy "gun" 108, and a ground station 110. In embodiments, systems can include fewer or additional individual non-flying game accessories than those depicted in FIG. 1. For example, a plurality of pucks 106 can be used in a particular game. In other embodiments, a plurality of toy guns 108 can be used. In other embodiments, a plurality of ground stations 110 can be used, and so on.

In some embodiments, remote-control flying craft 102 is a hovering flying craft adapted to be controlled by a hand-held remote controller 104, and comprises, in an embodiment, a molded frame assembly that includes a plurality of arms extending from a center body with an electric motor and corresponding propeller on each arm. In various embodiments, the motor and propeller are mounted downward-facing at a distal end of each arm with a motor cover over the motor. The center body in some embodiments is formed of a two-piece structure that sandwiches a circuit board to provide structural support for the frame. The circuit board in some embodiments includes a plurality of tabs that facilitate mounting of wire connectors, and can also provide antennas and emitters for both IR and RF communications. In some embodiments, a removable safety ring protects the propellers from lateral contact by an outer ring supported by a plurality of Y-arms that are each adapted to correspond to and interface with a corresponding one of the plurality of arms. Further, hovering remote-control flying craft 102 comprises a light-emitting diode (LED) or other semiconductor light source for lighting hovering remote-control flying craft 102.

Controller 104, in an embodiment, is a single-handed controller to be used by a user for controlling hovering remote-control flying craft 102, the controller comprising a controller body having an angled shape and including a flat top surface for orientation reference of the controller, a trigger projecting from the controller body adapted to interface with a forefinger of the user, a top hat projecting from the flat top surface adapted to interface with a thumb of the user, and electronics including at least one gyroscope, at least one accelerometer, a processor for sampling data from the at least one gyroscope and at least one accelerometer, and a radio adapted to transmit the sampled data to the hovering remote-control flying craft 102. Embodiments also include an infrared (IR) receiver and an infrared transmitter, or an infrared transceiver, in embodiments. As described, the triggering mechanism can be used during game play similar to gun 108 instead of, or in addition to, gun 108. Further, controller 104 comprises a light-emitting diode (LED) or other semiconductor light source for lighting controller 104 similar to craft 102.

For a more detailed description of one embodiment of the craft 102 and controller 104, reference is made to U.S. patent application Ser. No. 13/842,525, filed on Mar. 15, 2013 by John Paul Condon et al., titled "Remote-Control Flying Copter and Method," the detailed specification and figures of which are hereby incorporated by reference. While embodiments of the present invention are described with respect to a small, hovering remote-control craft in wireless communication with a paired wireless controller configured for single-handed tilt-control operations, it will be understood that other embodiments of the communications system for game play in accordance with the present invention may include other types of remote-control flying craft, such as planes or helicopters, or other non-flying remote-control craft, such as cars or boats, and may also include other types of controllers, such as a conventional dual joystick controller or a tilt-control based on an "app" (i.e., an application) running on a Smartphone or a software programming running on a laptop or desktop computer.

In various embodiments, puck 106 comprises a structure adapted to interface with land having a body and an infrared receiver. The body of puck 106 can be cube-shaped, in an embodiment. In other embodiments, the body can be a rectangular prism, a triangle-based prism, sphere-shaped, or any other desired shape. In embodiments, puck 106, and specifically, the infrared receiver, is adapted to receive infrared transmissions from a corresponding transmitter on, for example, hovering remote-control flying craft 102, controller 104, or gun 108. Puck 106 therefore comprises a "passive" non-flying game accessory. In various embodiments, puck 106 further comprises an infrared transmitter for transmitting infrared signals to hovering remote-control flying craft 102, controller 104, or gun 108, as well ground station 110. Embodiments of puck 106 therefore comprise an "active" non-flying game accessory.

In some embodiments, puck 106 comprises RF capability in addition to infrared capability. For example, puck 106 can further comprise an RF radio. In other embodiments, puck 106 can utilize the RF capability to interpret proximity of hovering remote-control flying craft 102 to puck 106. In game play, ammunition reloading, health recharging, capture, or race pylons, can thereby be utilized. In embodiments, puck 106 comprises an LED or other semiconductor light source for lighting puck 106.

In some embodiments, gun 108 comprises a handle, a barrel, a trigger projecting from the handle or barrel adapted to interface with a forefinger of the user, and an IR transmitter having IR transmission capability. When the trigger is activated, an IR transmission is sent out of the general direction of the barrel. In some embodiments, the IR transmission is substantially directional to enable the targeting of a particular target. In some embodiments, gun 108 further comprises an infrared receiver adapted to receive infrared transmissions from a corresponding transmitter. In an embodiment, gun 108 further comprises a low-power laser sight to enable the user to take aim at a particular target and show where the gun 108 is aimed. In another embodiment, gun 108 comprises RF capability in addition to infrared capability. For example, gun 106 can further comprise an RF radio.

In some embodiments, ground station 110 comprises, a tablet having a processor, communication capability, and a display. The processor, in combination with the communication capability can switch system 100 between games. For example, a different "game app" can be loaded into hovering remote-control flying craft 102, controller 104, puck 106, and/or gun 108 and likewise configure these components for the desired game. Therefore, communication capability can comprise RF protocols, IR protocols, or any other suitable wired or wireless protocol and can include one-way and/or two-way communication. The display can present game scores or statistics, or a current game status, including for each of the hovering remote-control flying craft 102, controllers 104, or accessories. In another embodiment, ground station 110, as depicted in FIG. 1, comprises a laptop computer having a processor, communication capability, and a display.

In embodiments, puck 106 can be utilized as a relay station between one or more ground stations 110. For example, puck 106 can further comprise a Bluetooth® radio configured to communicate with a corresponding Bluetooth® radio of a ground station 110. The radio in puck 106 may communicate with the ground station 110 in any of several protocols including Bluetooth, WiFi, Zigbee or a proprietary protocol. In this way, game-play information can be relayed to ground station 110 for analysis, display, or further configuration, where desired, as described below with respect to FIG. 10.

As shown in FIG. 1, the IR, RF, or other wired or wireless communication between elements of system 100 is readily recognized. The communication links are illustrative only, and are in no way limiting to the possibilities of the system 100. For example, hovering remote-control flying craft 102 can transmit IR signals to puck 106 in order to "shoot" puck 106 during flight or operation of hovering remote-control flying craft 102. Controller 104 can transmit RF signals to hovering remote-control flying craft 102 to control the flight of hovering remote-control flying craft 102. Further, the trigger of controller 104 can be relayed to hovering remote-control flying craft 102 via RF communication to indicate that hovering remote-control flying craft 102 should transmit IR signals as described to "shoot" from hovering remote-control flying craft 102. In other embodiments, gun 108 can transmit IR signals to hovering remote-control flying craft 102 so that hovering remote-control flying craft 102 is "shot" by gun 108. In embodiments, as described with respect to ground station 110, hovering remote-control flying craft 102 and controller 104 can be configured by accessory ground station 110 via wired or wireless protocol to enable various games. Likewise, accessories puck 106 and gun 108 can be configured by ground station 110 via wired or wireless protocol to enable various games, in coordination with hovering remote-control flying craft 102 and controller 104. All of these capabilities enable aerial game play, as will be described in examples that follow.

In terms of the RF and IR communications protocol, in various embodiments at least all of the craft and controllers communicate via a RF protocol that transmits at least control communications between a particular pair of the controller and the remote-control flying craft based on a pair identification information contained in the RF communication protocol, and all of the craft and at least one of the additional non-flying game accessory elements also communicate via at least an IR protocol that communicates game-play information among at least the plurality of remote-control flying craft. The below-mentioned games and communication systems, as well as others, can be implemented via one embodiment of the RF and IR communication protocols.

King of the Hill

In the traditional game of King of the Hill, the object is to stay on top of a "hill" (or any other designated area) as the "King of the Hill." Other players attempt to knock the current King off the pile and take his place, thus becoming the new King of the Hill. Wikipedia, en.wikipedia.org/wiki/King_of_the_Hill_(game), (last visited Oct. 1, 2012).

Figure 2:
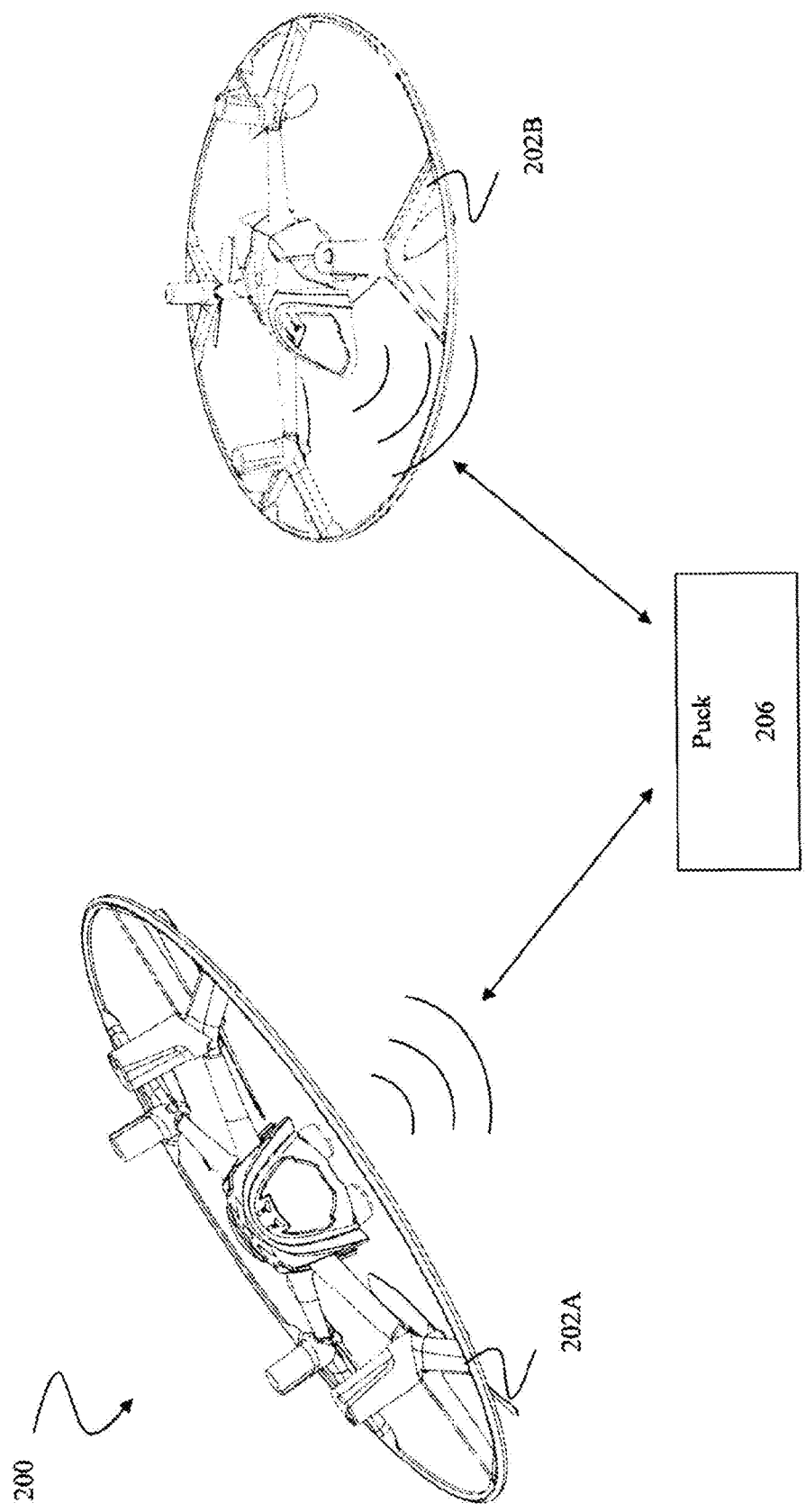
FIG. 2 is a block diagram of a gaming system for the game King of the Hill, according to some embodiments of the invention.

Referring to FIG. 2, a block diagram of a gaming system 200 for a two-team version of the game King of the Hill is depicted. System 200 comprises a first hovering remote-control flying craft 202A and a second hovering remote-control flying craft 202B, and a puck 206. First hovering remote-control flying craft 202A and second hovering remote-control flying craft 202B are on opposite teams, Team A and Team B, respectively. First hovering remote-control flying craft 202A and second hovering remote-control flying craft 202B are substantially similar to hovering remote-control flying craft 102, but are referred to here by 202A and 202B, respectively, for ease of explanation. First hovering remote-control flying craft 202A is controlled by a controller (not shown) configured to interface with hovering remote-control flying craft 202A. Likewise, second hovering remote-control flying craft 202B is controlled by a controller (not shown) configured to interface with hovering remote-control flying craft 202B. Each of hovering remote-control flying craft 202A and 202B can be lit by their respective LEDs in a different color, denoting the teams.

In system 200, puck 206 is substantially similar to puck 106. Puck 206 is the "hill." Control is gained of the "hill" by hovering remote-control flying craft 202A or 202B being in close proximity of puck 206 for a predefined number of seconds, or by shooting puck 206 a predefined number of times. Strategy in maneuvering the respective craft can be utilized in order to protect puck 206 from the opposing team for as long as possible. Points can be accumulated for either team according to the number of seconds control of the "hill" is maintained. Puck 206 can be lit via its LED to indicate the team of the current king. In embodiments, ground station 110 (not shown) can display the current king or other game status or statistics.

Additional craft (not shown) for each team can readily be added to system 200. For example, both Team A and Team B can comprise two craft each. In other embodiments, a plurality of craft can be added to each team. In another embodiment, one team can play handicapped with fewer craft than the other team. In other embodiments, additional teams can be added to the game.

Domination

In the traditional game of Domination, whether on the playground or as a board game, the idea is to gain all of the players (by tagging them), or land mass (by occupying every territory on the board and in so doing, eliminating all other players).

Figure 3:
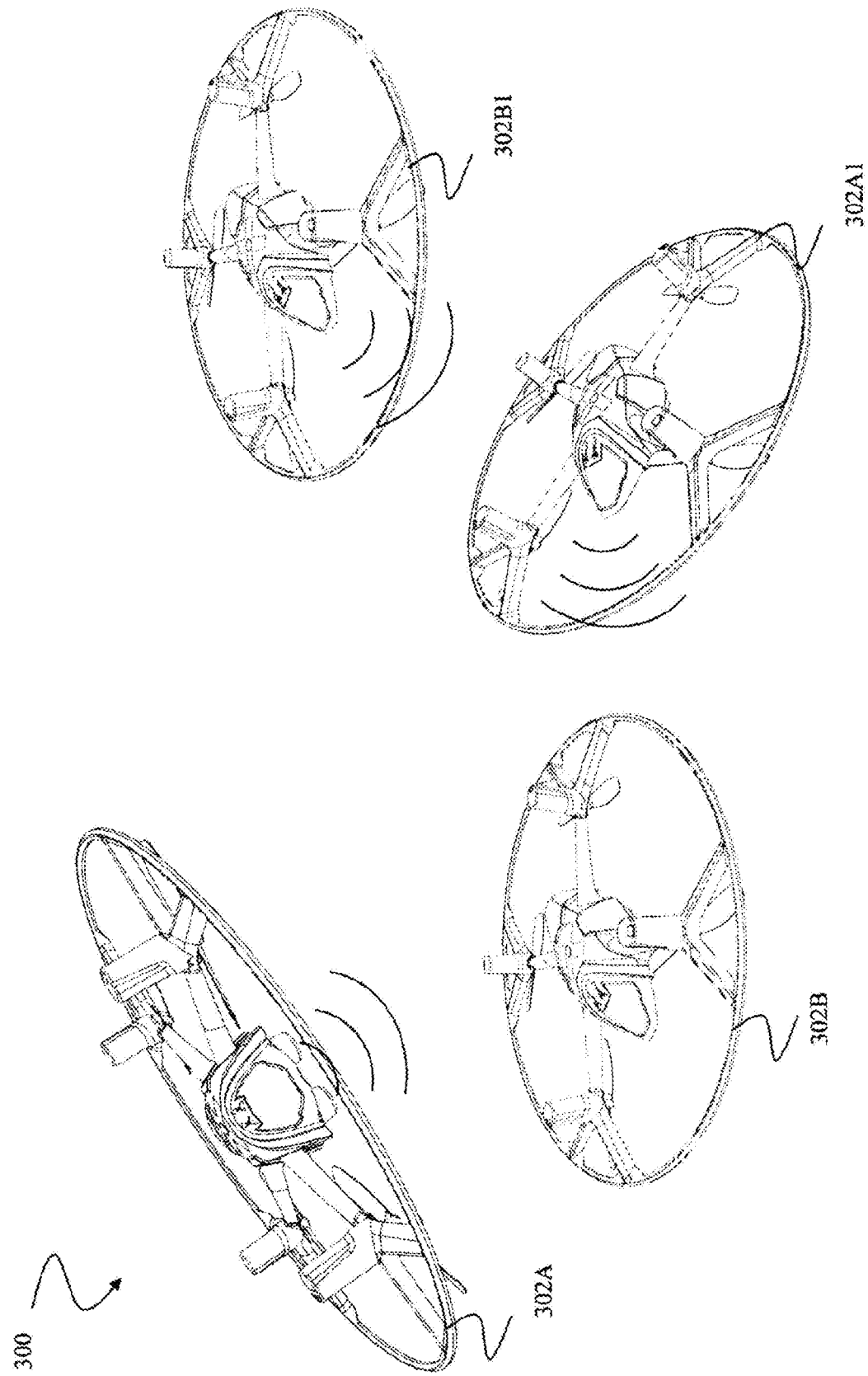
FIG. 3 is a block diagram of a gaming system for the game Domination, according to some embodiments of the invention.

Referring to FIG. 3, a block diagram of a gaming system for a two-team version of the game Domination is depicted. System 300 comprises a first team, Team A, including a first hovering remote-control flying craft 302A and a second hovering remote-control flying craft 302A1. System 300 likewise comprises a second team, Team B, including a third hovering remote-control flying craft 302B and a fourth hovering remote-control flying craft 302B1. Craft 302A, 302A1 302B, and 302B1 are each substantially similar to hovering remote-control flying craft 102.

The game begins with teams, here illustrated as two teams—Team A and Team B. Craft 302A, 302A1 302B, and 302B1 are controlled by their respective controllers (not shown) to "shoot," via IR transmission, an opponent's hovering remote-control flying craft. Once the IR transmission is received by the opponent hovering remote-control flying craft, the opponent switches to the team of the shooter. The Domination game ends when all players are on the same team. Each of hovering remote-control flying craft 302A, 302A1 302B, and 302B1 can be lit via their respective LED to indicate the current team. The LEDs can change throughout the game, indicating the current status of the teams.

For example, first hovering remote-control flying craft 302A and second hovering remote-control flying craft 302A1 can be illuminated red by their respective LED lights. Third hovering remote-control flying craft 302B and fourth hovering remote-control flying craft 302B1 can be illuminated blue by their respective LED lights. As illustrated in FIG. 3, during game play, first hovering remote-control flying craft 302A is instructed by the user controlling first hovering remote-control flying craft 302A to "shoot" at current opponent third hovering remote-control flying craft 302B. Once third hovering remote-control flying craft 302B receives the IR transmission, it switches to red and is then on Team A. Similarly, fourth hovering remote-control flying craft 302B1 is instructed by the user controlling fourth hovering remote-control flying craft 302B1 to "shoot" at current opponent second hovering remote-control flying craft 302A1. Once second hovering remote-control flying craft 302A1 receives the IR transmission, it switches to blue and is then on Team B. In embodiments, ground station 110 (not shown) can display the current dominant team or other game status or statistics.

Additional craft (not shown) for each team can readily be added to system 300. For example, both Team A and Team B can comprise two craft each, as depicted. In other embodiments, teams can comprise three or more craft. In another embodiment, one team can begin play handicapped with fewer craft than the other team. In other embodiments, additional teams can be added to the game.

Capture the Flag and Capture the Team

In the traditional game of Capture the Flag, two teams each have a flag (or other marker) and the objective is to capture the other team's flag, located at the team's "base," and bring it safely back to their own base. In other versions, enemy players can be "tagged" by players in their home territory; these players are then, depending on the agreed rules, out of the game, members of the opposite team, sent back to their own territory, or "in jail." Wikipedia, en.wikipedia.org/wiki/Capture_the_flag, (last visited Oct. 2, 2012).

Figure 4:
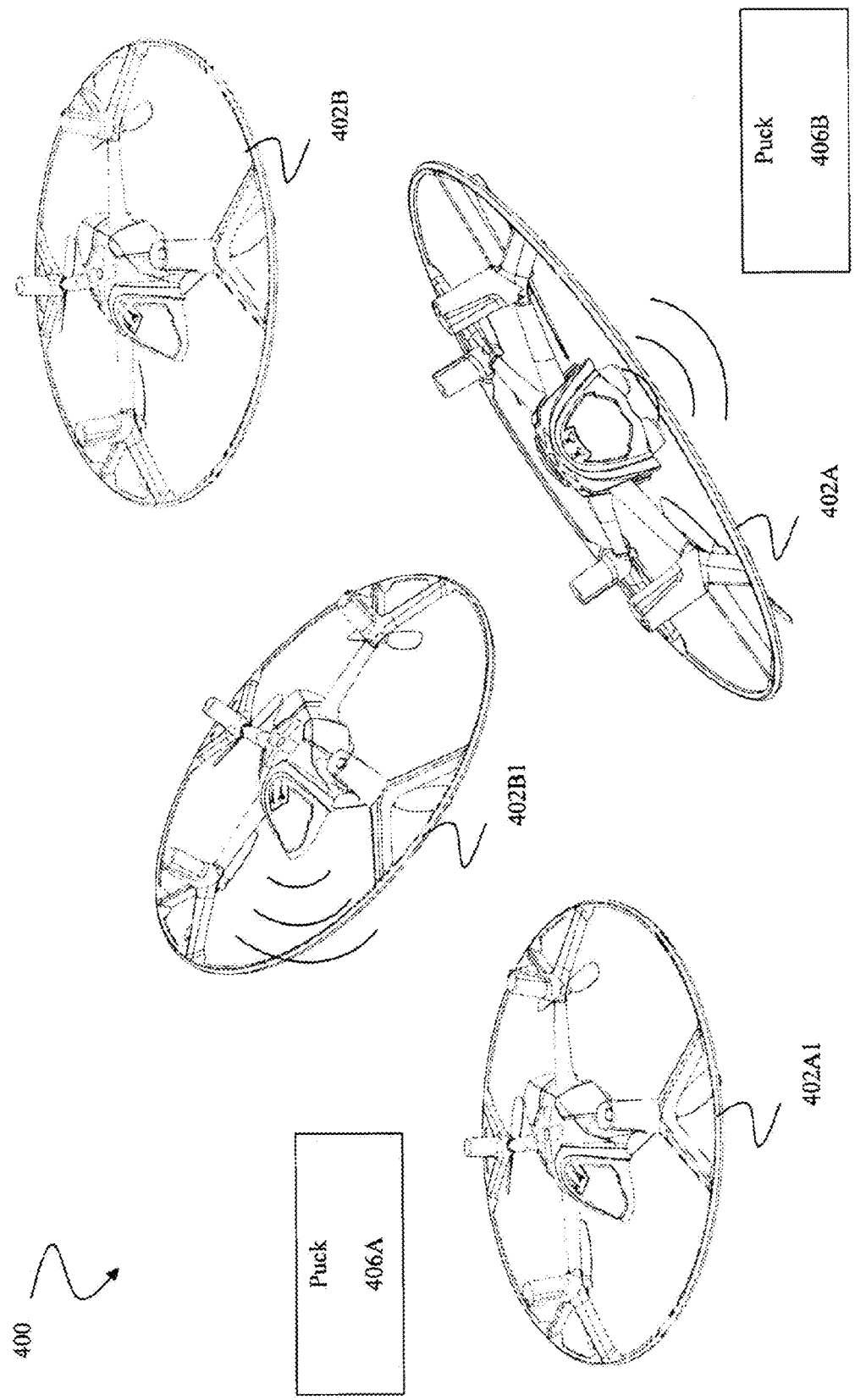
FIG. 4 is a block diagram of a gaming system for the game Capture the Flag, according to some embodiments of the invention.

Referring to FIG. 4, a block diagram of a gaming system for a two-team version of the game Capture the Flag is depicted. System 400 comprises a first team, Team A, including a first hovering remote-control flying craft 402A and a second hovering remote-control flying craft 402A1. System 400 likewise comprises a second team, Team B, including a third hovering remote-control flying craft 402B and a fourth hovering remote-control flying craft 402B1. Craft 402A, 402A1 402B, and 402B1 are each substantially similar to hovering remote-control flying craft 102. System 400 further comprises a first puck 406A corresponding to the "flag" of Team A and a second puck 406B corresponding to the "flag" of Team B. Pucks 406A and 406B are substantially similar to puck 106.

During game play, a hovering remote-control flying craft 402A, 402A1 402B, or 402B1, under control of a user by a controller, must be within close proximity of the opponent's puck 406A or 406B to capture the "flag." The hovering remote-control flying craft 402A, 402A1 402B, or 402B1 must then return to near their own team's puck 406A or 406B and be within close proximity of the puck or shoot it to win. For example, first hovering remote-control flying craft 402A is instructed by the user controlling first hovering remote-control flying craft 402A to fly near Team B's puck 406B and "shoot" puck 406B. Similarly, fourth hovering remote-control flying craft 402B1 is instructed by the user controlling fourth hovering remote-control flying craft 402B1 to fly near Team A's puck 406A and "shoot" puck 406A. First hovering remote-control flying craft 402A must then return to puck 406A and shoot puck 406A, in embodiments, or be within proximity of 406A to have thereby returned with Team B's "flag." Likewise, fourth hovering remote-control flying craft 402B1 must then return to puck 406B and shoot puck 406B, in embodiments, or be within proximity of 406B to have thereby returned with Team A's "flag."

Other embodiments of advanced Capture the Flag game play can include hovering remote-control flying craft "shooting" at each other using IR transmissions to, depending on the agreed rules, deactivate the shot hovering remote-control flying craft such that it is out of the game, transform the shot hovering remote-control flying craft to a member of the opposite team, or require the shot hovering remote-control flying craft to go back to their own puck and shoot it in order to once again attack the opposing puck. Each of hovering remote-control flying craft 402A, 402A1 402B, and 402B1 can be lit via their respective LED to indicate the current team. In embodiments, ground station 110 (not shown) can display the current game status or statistics.

Additional hovering remote-control flying craft (not shown) to each team can readily be added to system 400. For example, both Team A and Team B can comprise two hovering remote-control flying craft each, as depicted. In other embodiments, teams can comprise three or more hovering remote-control flying craft. In another embodiment, one team can play handicapped with fewer hovering remote-control flying craft than the other team. In other embodiments, additional teams can be added to the game.

Similarly, the game Capture the Team can be played as a hybrid of Domination and Capture the Flag.

Tag

In the traditional game of Tag, a group of players (two or more) decide who is going to be "it." The player selected to be "it" then chases the others, attempting to get close enough to tag them or touch them while the others try to escape. A tag makes the tagged player "it." Wikipedia, http://en.wikipedia.org/wiki/Tag_(game), (last visited Oct. 2, 2012).

Figure 5:
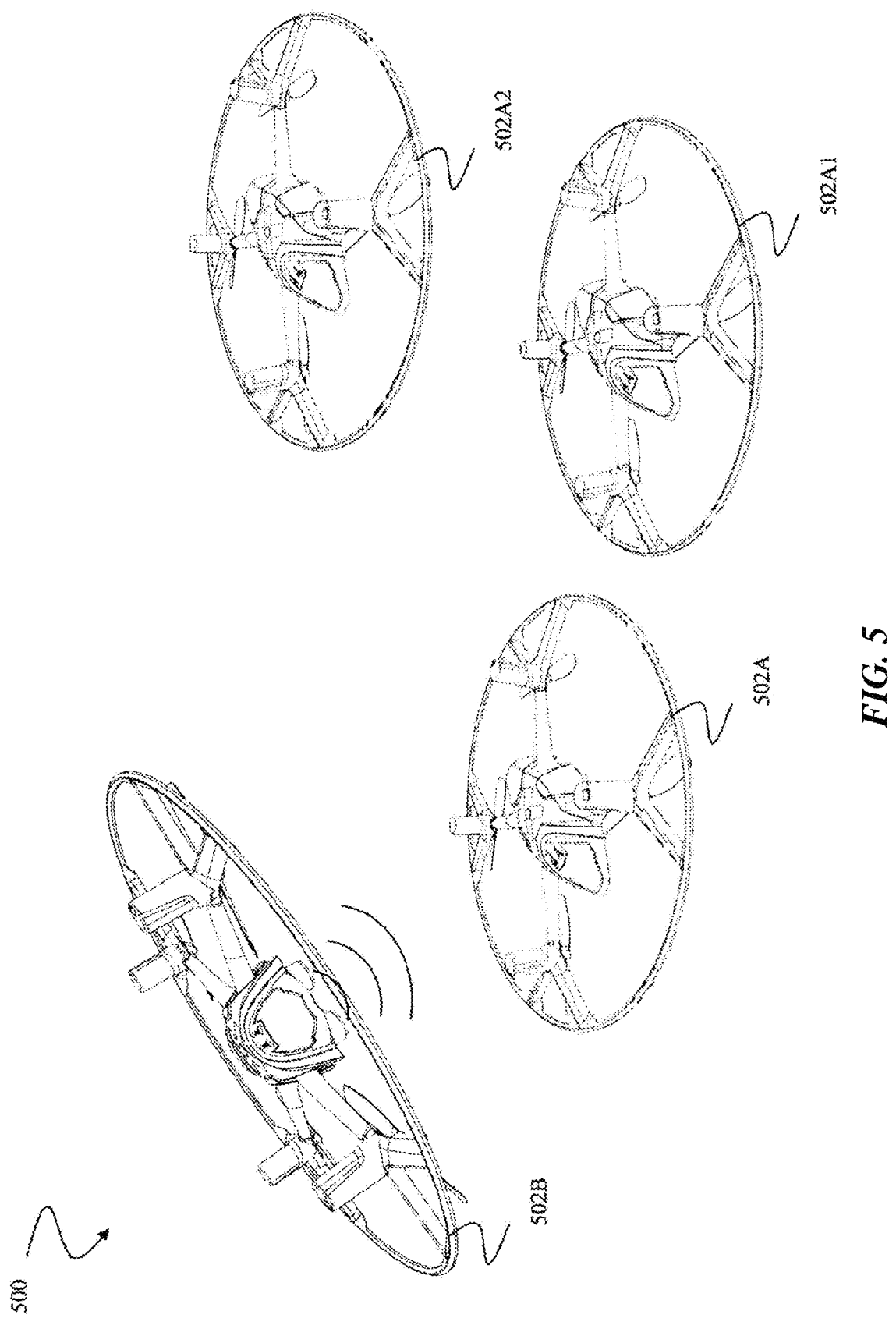
FIG. 5 is a block diagram of a gaming system for the game Tag, according to some embodiments of the invention.

Referring to FIG. 5, a block diagram of a gaming system for the game Tag is depicted. System 400 comprises a first hovering remote-control flying craft 502A, a second hovering remote-control flying craft 502A1, a third hovering remote-control flying craft 502A2, and a fourth hovering remote-control flying craft 502B. All of first hovering remote-control flying craft 502A, second hovering remote-control flying craft 502A1, and third hovering remote-control flying craft 502A2 are on first Team A, while the remaining fourth hovering remote-control flying craft 502B is "it" and on Team B. Hovering remote-control flying craft 502A, 502A1, 502A2, and 502B are each substantially similar to hovering remote-control flying craft 102.

During game play, when the "it" player shoots another player, the shooter joins team "A" while the hit player is now "it" and on team B. For example, as illustrated in FIG. 5, fourth hovering remote-control flying craft 502B is instructed by the user controlling fourth hovering remote-control flying craft 502B to fly near first hovering remote-control flying craft 502A and "shoot," using IR transmission, first hovering remote-control flying craft 502A. First hovering remote-control flying craft 502A receives the IR transmission from fourth hovering remote-control flying craft 502B and switches teams, so that first hovering remote-control flying craft 502A is now "it." Likewise, fourth hovering remote-control flying craft 502B receives confirmation of the IR transmission reception and switches teams so that fourth hovering remote-control flying craft 502B is no longer "it." Each of hovering remote-control flying craft 502A, 502A1, 502A2, and 502B can be lit via their respective LED to indicate the current team. In embodiments, ground station 110 (not shown) can display the current game status or statistics, such as the time each hovering remote-control flying craft has been "it."

Additional hovering remote-control flying craft (not shown) for each team can readily be added to system 400. For example, in other embodiments, Team A can comprise four or more craft. In other embodiments, additional teams can be added to the game.

Elimination

In the traditional game of Elimination, the game begins with a number of players even split among a number of teams, typically two teams. Whenever one player on a first team tags another player on a second team, that second-team player is "out" and leaves the game. The team with players remaining wins.

Figure 6:
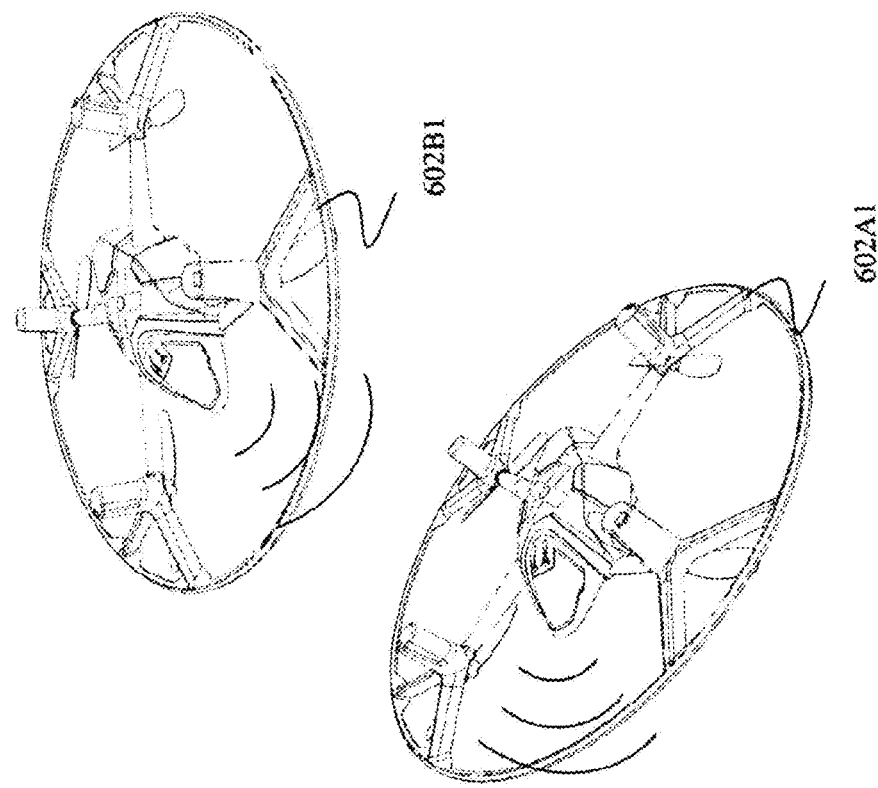
FIG. 6 is a block diagram of a gaming system for the game Elimination, according to some embodiments of the invention.
Figure 6:
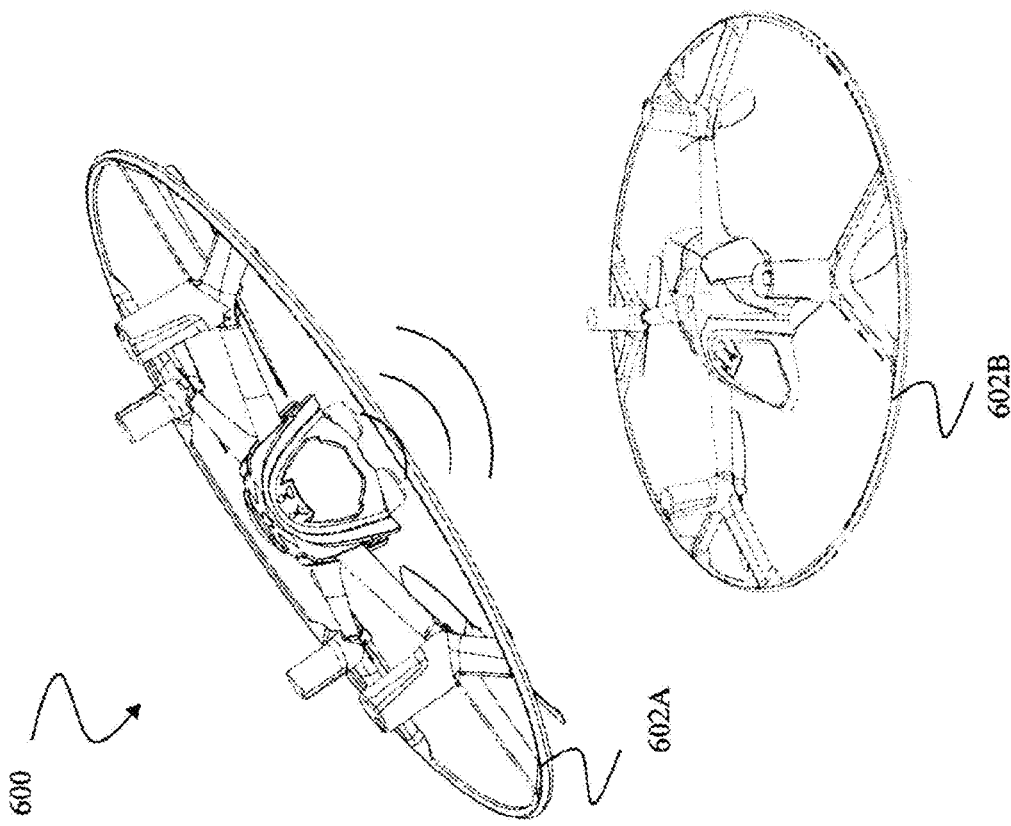

Referring to FIG. 6, a block diagram of a gaming system for the game Elimination is depicted. System 600 comprises a first team, Team A, including a first hovering remote-control flying craft 602A and a second hovering remote-control flying craft 602A1. System 600 likewise comprises a second team, Team B, including a third hovering remote-control flying craft 602B and a fourth hovering remote-control flying craft 602B1. Hovering remote-control flying craft 602A, 602A1 602B, and 602B1 are each substantially similar to hovering remote-control flying craft 102.

The game begins with teams, here illustrated as two teams—Team A and Team B. Hovering remote-control flying craft 602A, 602A1 602B, and 602B1 are controlled by their respective controllers (not shown) to "shoot," via IR transmission, an opponent's hovering remote-control flying craft. Once the IR transmission is received by the opponent hovering remote-control flying craft, the opponent is out and that hovering remote-control flying craft can be deactivated such that it is out of the game. The Elimination game ends when all players on one team have been eliminated. Each of hovering remote-control flying craft 602A, 602A1, 602B, and 602B1 can be lit via their respective LED to indicate the current team.

As illustrated in FIG. 6, during game play, first hovering remote-control flying craft 602A is instructed by the user controlling first hovering remote-control flying craft 602A to "shoot" at opponent third hovering remote-control flying craft 602B. Once third hovering remote-control flying craft 602B receives the IR transmission, it is eliminated and changes LED color to an "out" color or is deactivated to no longer fly, with algorithms provided to return hovering remote-control flying craft 602B safely to the ground. Similarly, fourth hovering remote-control flying craft 602B1 is instructed by the user controlling fourth hovering remote-control flying craft 602B1 to "shoot" at opponent second hovering remote-control flying craft 602A1. Once second hovering remote-control flying craft 602A1 receives the IR transmission, it is eliminated and changes LED color to an "out" color or is deactivated to no longer fly. In embodiments, ground station 110 (not shown) can display the current dominant team or other game status or statistics.

Additional craft (not shown) for each team can readily be added to system 400. For example, both Team A and Team B can comprise two craft each, as depicted. In other embodiments, teams can comprise three or more craft. In another embodiment, one team can play handicapped with fewer craft than the other team. In other embodiments, additional teams can be added to the game.

Quidditch®

In the fictional game of Quidditch®, created by J. K. Rowling for the Harry Potter series of novels, matches are played between two teams of players riding flying broomsticks, using balls and elevated ring-shaped goals on each side of the field. The Quaffle is a larger ball intended to be thrown through the goals. The Golden Snitch is a smaller golden ball and is enchanted to hover, dart, and fly around the pitch, avoiding capture while remaining within the boundaries of the playing area.

Various team positions have also been developed. The Chasers progress up and down the pitch passing the Quaffle by hand amongst themselves while keeping it away from the other team, in an attempt to score goals by throwing it through one of their opponent's goal hoops. The Keeper protects the goal hoops. The Beaters are armed with wooden clubs and are tasked with protecting their teammates and the seeker (mainly) from the Bludgers by knocking these balls off course or towards opponents. The Seeker is tasked with searching for and capturing the Golden Snitch. Seekers are the only players permitted to touch the Snitch. Wikipedia, http://en.wikipedia.org/wiki/Quidditch, (last visited Oct. 2, 2012).

Figure 7:
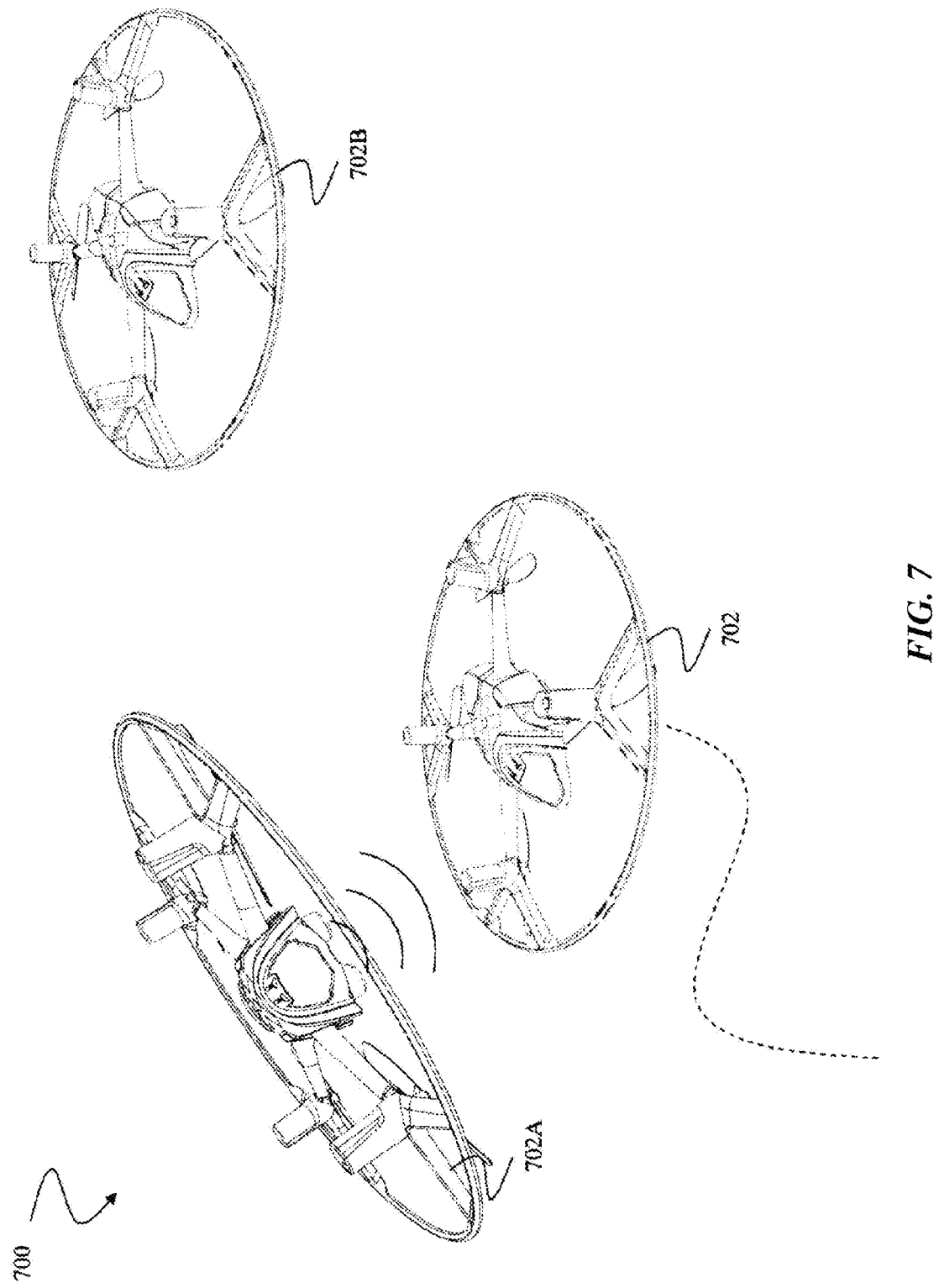
FIG. 7 is a block diagram of a gaming system for a one-on-one game of Quidditch®, according to some embodiments of the invention.

Referring to FIG. 7, a block diagram of a gaming system for a hovering remote-control craft version of a one-on-one "Golden Snitch" game of Quidditch® is depicted. In this embodiment of Quidditch®, the first to catch the Golden Snitch by "shooting" it a predetermined number of times wins the game. System 700 comprises a first hovering remote-control flying craft 702A, a second hovering remote-control flying craft 702B, and a third hovering remote-control flying craft 702 acting as the snitch. Hovering remote-control flying craft 702, 702A, and 702B are each substantially similar to hovering remote-control flying craft 102.

Hovering remote-control flying craft 702, acting as the Golden Snitch, is programmed to automatically fly in a random flight path once game play begins. Hovering remote-control flying craft 702 can be illuminated by LED as a golden color. Hovering remote-control flying craft 702A and hovering remote-control flying craft 702B are on opposing sides and can therefore be illuminated in different LED colors. During the game, hovering remote-control flying craft 702A and hovering remote-control flying craft 702B can be instructed by the users controlling the respective hovering remote-control flying craft 702A and 702B to "shoot" at hovering remote-control flying craft 702 using IR transmissions. In the depiction of FIG. 7, hovering remote-control flying craft 702A is shooting hovering remote-control flying craft 702, thereby capturing the Golden Snitch. In embodiments, hovering remote-control flying craft 702 then changes LED color to the color of hovering remote-control flying craft 702A. In embodiments, ground station 110 (not shown) can display the current game status or statistics.

Figure 8:
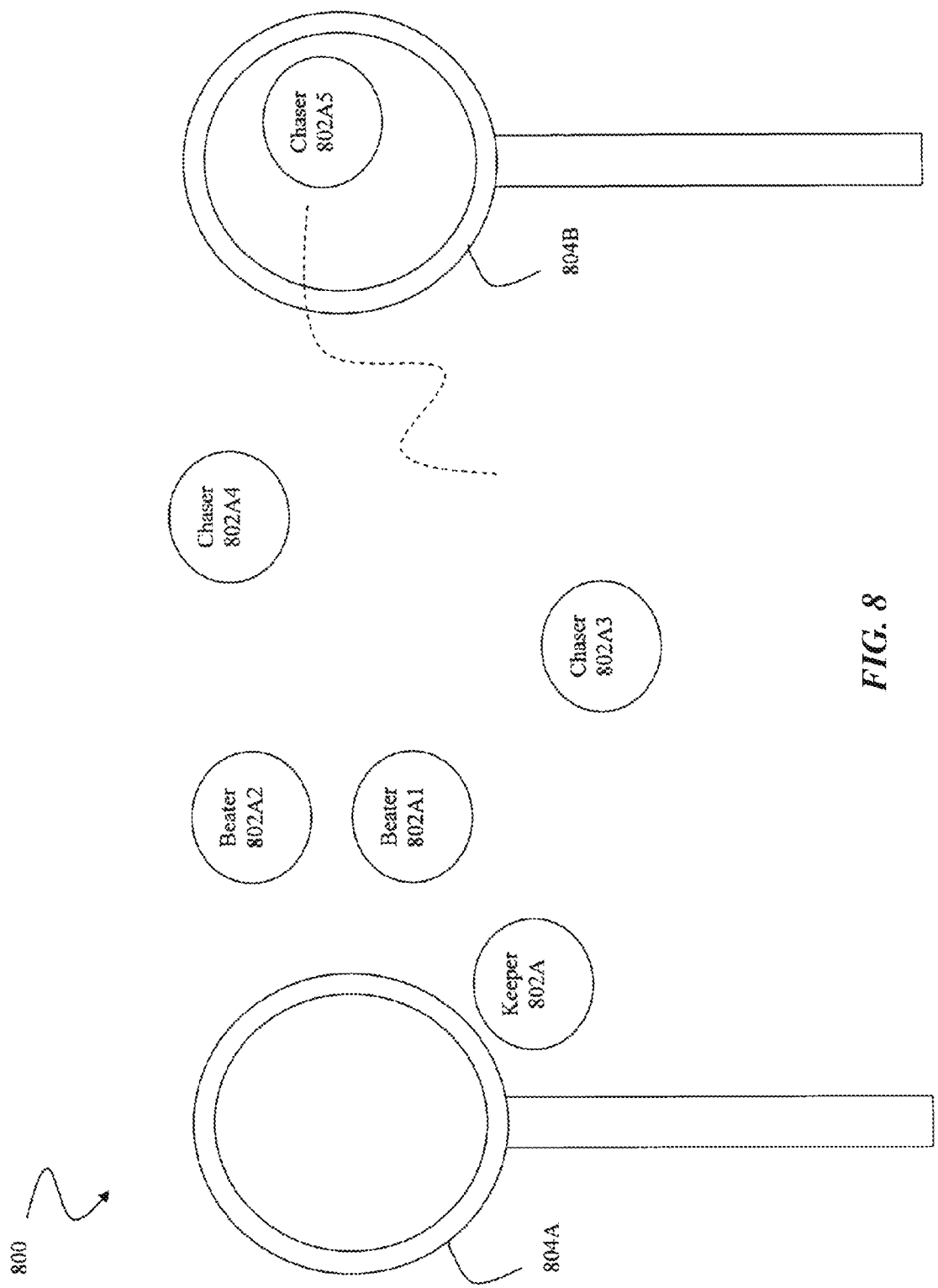
FIG. 8 is a block diagram of a gaming system for a full game of Quidditch®, according to some embodiments of the invention.

Referring to FIG. 8, a block diagram of a gaming system for a hovering remote-control craft version of a full game for of Quidditch® is depicted. For clarity, the hovering remote-control flying craft for only one side is depicted, but the rings for scoring for both sides are depicted for ease of explanation. In this embodiment of Quidditch®, instead of having the Chasers throw the Quaffle through a ring to score, the players fly their hovering remote-control flying craft through rings to score. In an exemplary embodiment, each team includes a Keeper and two Beaters (defenders who cannot score), and three Chasers who can score. Strategy can thereby be employed by users by bumping or ramming opposing hovering remote-control flying craft. Optionally, a Golden Snitch can be added as described above in the one-on-one version of Quidditch® by incorporating an additional hovering remote-control flying craft (not shown).

System 800, as shown, again only with one team, consists of a first hovering remote-control flying craft 802A denoted as the Keeper, a second hovering remote-control flying craft 802A1 as a Beater, a third hovering remote-control flying craft 802A2 as another Beater, a fourth hovering remote-control flying craft 802A3 as a Chaser, a fifth hovering remote-control flying craft 802A4 as another Chaser, and a sixth hovering remote-control flying craft 802A5 as the last Chaser. Hovering remote-control flying craft 802A-802A5 are each substantially similar to hovering remote-control flying craft 102. Each hovering remote-control flying craft 802A-802A5 is controlled by a controller (not shown) configured to interface with each of the respective hovering remote-control flying craft. These hovering remote-control flying craft make up Team A. The opposing side to Team A would likewise have a similar number of hovering remote-control flying craft with similar roles. System 800 further includes ring 804A that depicts the "goal" for Team A, and ring 804B that depicts the "goal" for Team B. Additional rings can be incorporated on each side to reflect a "true" Quidditch® field.

As depicted in FIG. 8, hovering remote-control flying craft 802A is defending Team A's goal, with hovering remote-control flying craft 802A1 and 802A2 assisting on defense. Hovering remote-control flying craft 802A3, 802A4, and 802A5 are attacking toward ring 804B, the goal of Team B. Hovering remote-control flying craft 802A5 is shown crossing through ring 804B to score for Team A. In some embodiments, ground station 110 (not shown) can display the current game status or statistics.

Duck Hunt

In the game of Duck Hunt, made popular by Nintendo® in the 1980's, players use the Nintendo Light Gun and attempt to shoot down either ducks or clay pigeons in mid-flight by aiming the gun at a screen. Wikipedia, en.wikipedia.org/wiki/Duck_Hunt, (last visited Oct. 2, 2012).

Figure 9:
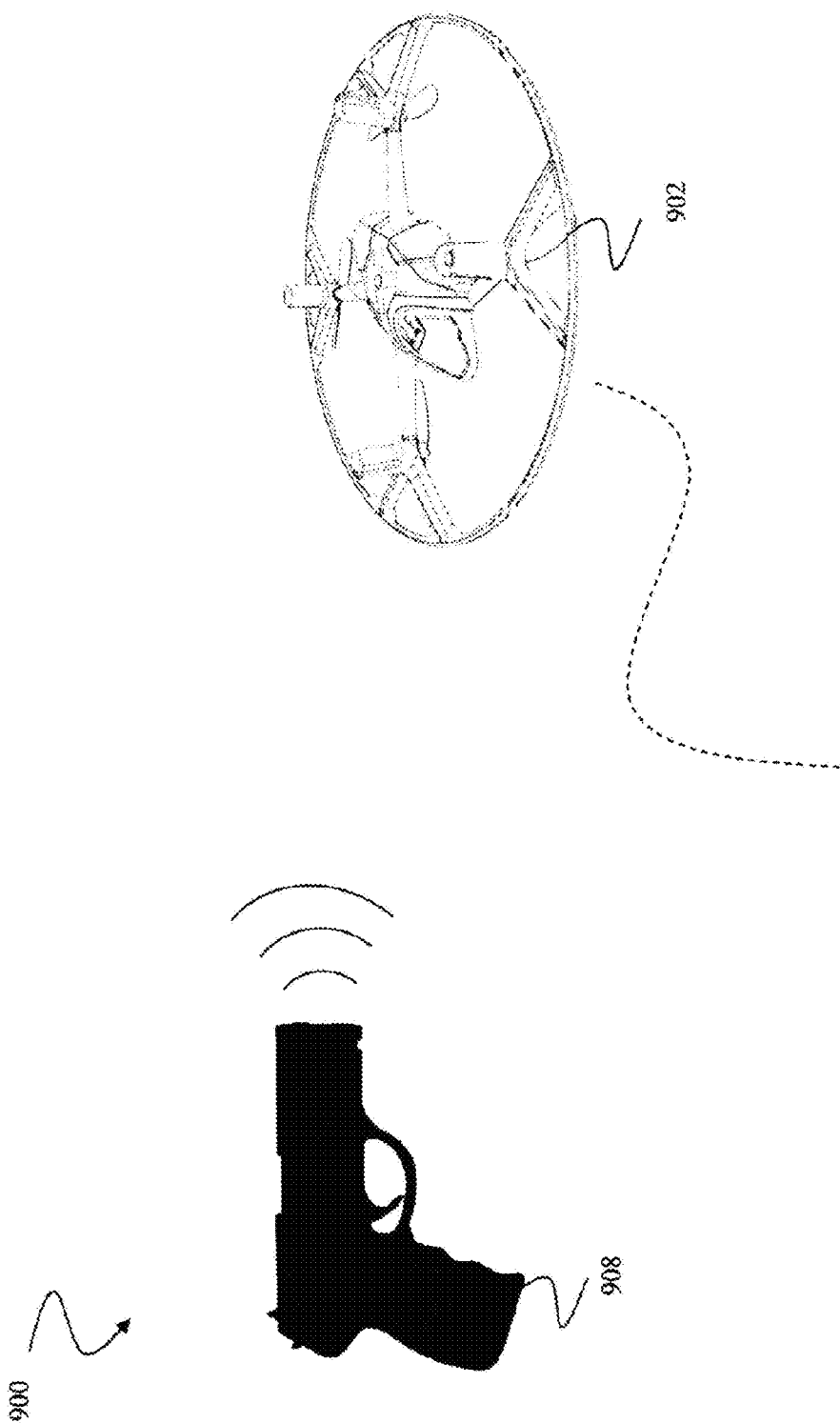
FIG. 9 is a block diagram of a gaming system for the game Duck Hunt, according to some embodiments of the invention.

Referring to FIG. 9, a block diagram of a gaming system for the game Duck Hunt is depicted. System 900 comprises a hovering remote-control flying craft 902 and a gun 908. Hovering remote-control flying craft 902 is substantially similar to hovering remote-control flying craft 102, and gun 908 is substantially similar to gun 108. In embodiments of system 900, hovering remote-control flying craft 902 comprises the "duck" or "clay pigeon."

During game play, hovering remote-control flying craft 902 is instructed by the user controlling hovering remote-control flying craft 902 to fly around a game-play area, ideally in an unpredictable flight pattern. A second user controlling gun 908 directs gun 908 in the direction of hovering remote-control flying craft 902 and pulls the trigger, thereby "shooting" at hovering remote-control flying craft 902. Once the second user has "shot" hovering remote-control flying craft 902 once or a predetermined number of times, hovering remote-control flying craft 902 is "dead" and the game is over. In embodiments, ground station 110 (not shown) can display the current game status or statistics, such as the time elapsed for each hovering remote-control flying craft to be "shot."

Additional hovering remote-control flying craft (not shown) can readily be added to system 900. For example, Duck Hunt can be played with multiple craft 902, so that the user operating gun 908 can target these additional craft. Further, the game can be played with teams, each team incorporating one or more guns 908 and craft 902.

In some embodiments, hovering remote-control flying craft 902 is controlled autonomously using preprogrammed instructions to fly around a game-play area autonomously, ideally in an unpredictable flight pattern, such that Duck Hunt can be played in a single-player mode. In some such embodiments player one targets hovering remote-control flying craft 902 with gun 908 and attempts to "shoot" hovering remote-control flying craft 902 while hovering remote-control flying craft 902 flies autonomously around an area of play. In some embodiments, the area of play is user definable via software, an app, and/or user input controls available on the craft of controller.

In some embodiments of Duck Hunt, ducks can "shoot" the hunters. For example, remote-control flying craft 902 can be controlled by a controller (not shown) to command craft 902 to "shoot" at an opponent hunter, or another user operating gun 908 to "shoot" at craft 902. In some embodiments, gun 908 is configured to receive IR transmissions. In other embodiments, the user of gun 908 can wear an additional accessory to receive IR transmissions, such as an IR-receiving vest or other apparel or accessory.

In a variation of the embodiment described above, multiple craft can be controlled by multiple users on the same team to comprise a "team" of ducks. In other embodiments, multiple shooters can comprise a team of hunters. In another embodiment, a single user can play as both a duck and a hunter, controlling both guns 908 and a controller to shoot craft 902 at other hunters.

Figure 10:
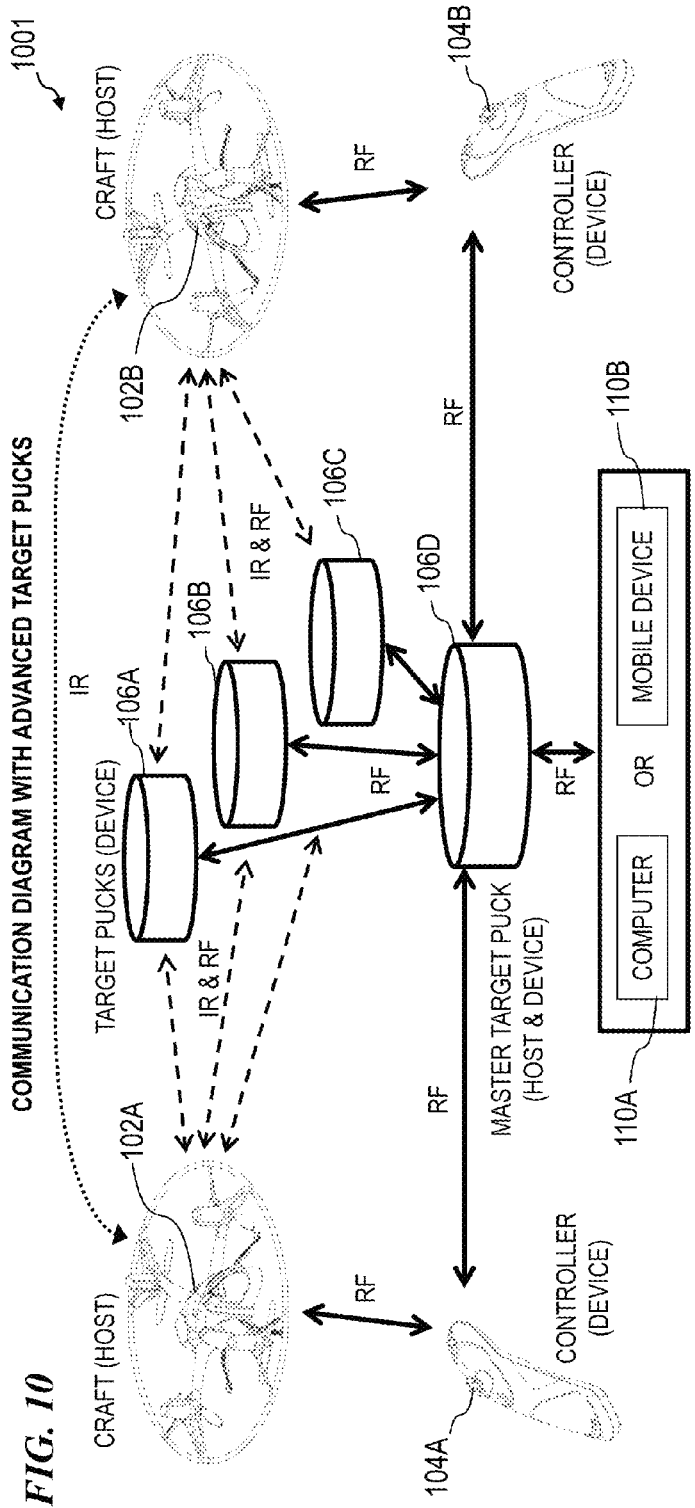
FIG. 10 is a block diagram of a gaming system according to some embodiments of the invention that include a game-control application configured to execute on a computing device.

FIG. 10 depicts a gaming system according to an embodiment that includes a game control application configured to execute on a computing device. For example, controller 104A is paired with craft 102A while controller 104B is paired with craft 102B using an RF communications control protocol. Both crafts 104A and 104B are communicating with target pucks 106A-D by both RF and IR signals. Pucks 106A, 106B and 106C are each communicating with master puck 106D by RF signals. Master puck 106D is also capable of communicating with the game control station laptop computer 110A or tablet computer 110B by RF signals. The communications between master puck 106D and game control station 110A or 110B may be via several protocols including Bluetooth, WiFi, Zigbee or a proprietary protocol.

FIG. 10 further depicts the types of information that may be communicated between the various parts of the gaming system and the maximum number of node types that may be supported by the gaming system at any given time. For example, the craft 102A may be communicating "Control and Status Updates" to the controller 104A. The craft 102A may further be communicating proximity alert and IR hits with all the pucks 106A-D. The craft 102A may communicate the IR hits with the craft 102B. The master puck 106D may communicate target status with any of pucks 106A-C as well as game status with game control station 110A or 110B and player status with controller 104A or 104B. In the gaming system there may only be one game control system 110 and only one master target puck 106D. However there may be one or more controllers 104, craft 102 or non-master target pucks 106.

Figure 11:
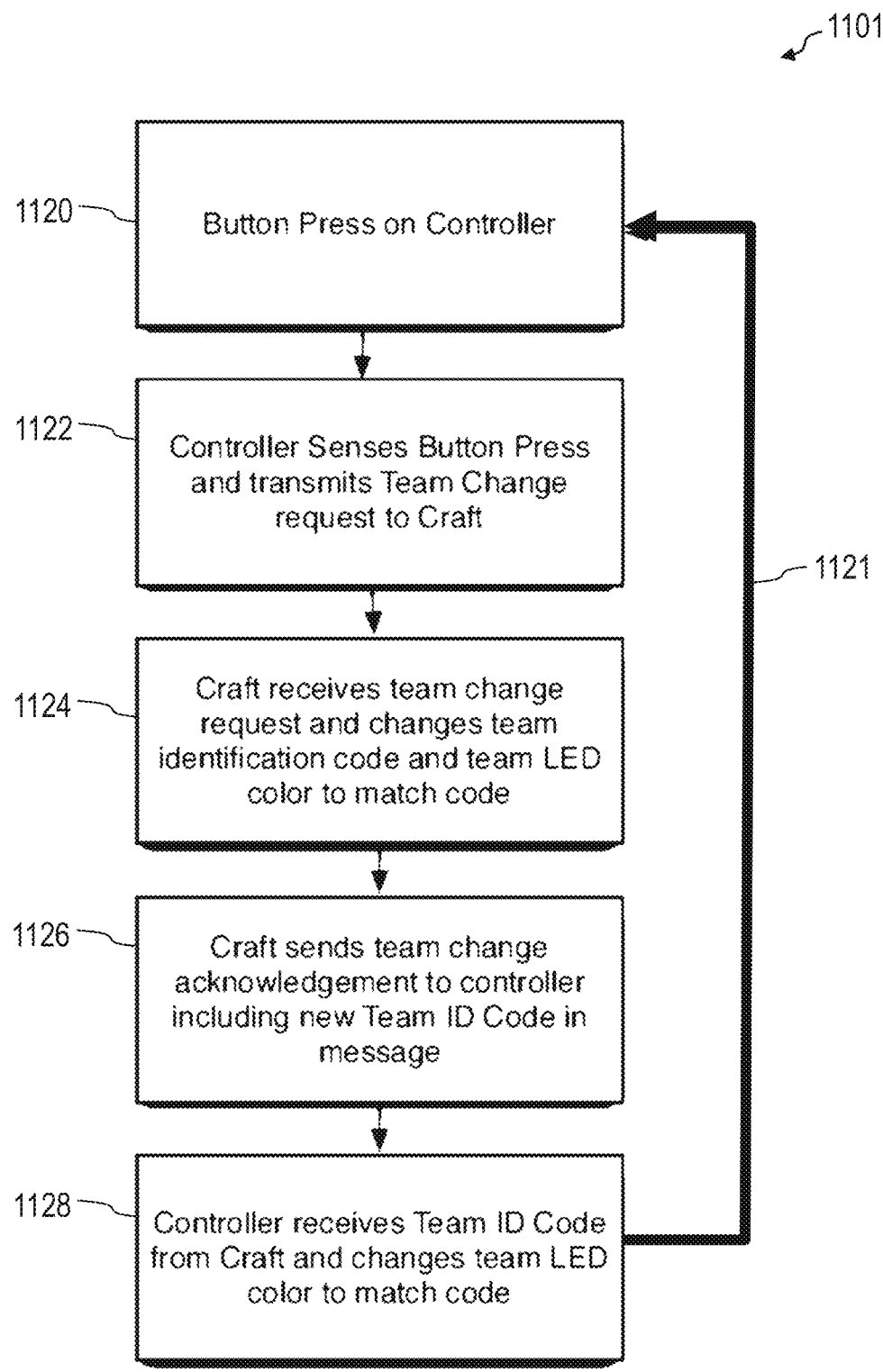
FIG. 11 shows specification details for an embodiment of the RF communication protocol included in the Team Selection state engine.

FIG. 11 is a block diagram depicting the details for an embodiment of the RF communication protocol creating in the Team Selection state engine. For example, in some embodiments, this protocol begins with the user pressing the team selection button on controller 104, as described in Block 1120. The controller 104 senses the button press and transmits a team change message to craft 102, as described in Block 1122. Craft 102 receives the team change request and increments 1124 the internal team code setting to the next available code and craft 102 then changes the color of the LED to match the team code selected, as described in Block 1124. Craft 102 transmits an acknowledgement message to controller 104 that includes the active team code on craft 102, as described in Block 1126. The controller 104 receives the message from the craft 102 and updates the controller 104 team code register and indicates to the user that the change is complete by changing the LED to match the updated team code, as described in Block 1128. Controller 104 then continues to monitor 1121 the team selection button for another button press.

In some embodiments, the present invention provides a three-dimensional gaming system that enables game play among remote-control craft, wherein the gaming system includes, at least four remote-control craft, each craft selectively paired with and controlled by a corresponding controller via a radio-frequency (RF) communication protocol implemented between the corresponding controller and the remote-control craft that transmits at least craft control communications between a particular selectable pair of the controller and the remote-control craft based on a pair identification information contained in the RF communication protocol, each controller including at least a trigger mechanism that communicates information via the RF communication protocol to a corresponding remote-control craft of the particular selectable pair for use in controlling and communicating game-play information among at least the remote-control craft via an infrared (IR) communication protocol implemented via an infrared transmitter and receiver on the corresponding remote-control craft, wherein at least two sets of at least two of the particular selectable pairs are also selectively assigned to a different team for purposes of playing multiplayer team games based on a team identification information in the RF communication protocol.

In some embodiments, the gaming system includes at least one additional game accessory element that is equipped with an infrared transmitter and receiver to communicate via the IR communication protocol with at least one of the remote-control craft. In some embodiments, at the least one additional accessory element is further equipped to transmit communications via the RF communication protocol. In some embodiments, the at least one additional accessory element is selected from the set consisting of a target puck, a reloading station, a gun, or any combination thereof.

In some embodiments, the remote-control craft are flying craft and the accessory elements are non-flying objects.

In some embodiments, the gaming system includes a game-control application configured to execute on a computing device having an RF communication channel for accessing the RF communication protocol, the game-control application being programmed to dynamically display information from the gaming system related to the multiplayer team games.

In some embodiments, the RF communication channel is a Bluetooth® communication channel between the computing device and at least one accessory element.

In some embodiments, the RF communication channel is RF communication circuitry on a USB dongle configured to utilize the RF communication protocol.

In some embodiments, the remote-control craft and the controllers each include at least one multi-color LED configured to display a common selectable color that is the same for both the craft and the controller of the particular selectable pair and indicates the team to which the particular selectable pair of the craft and controller are assigned for purposes of playing multiplayer team games.

In some embodiments, the multiplayer team games are selected from the set including Domination, Capture the Flag, Capture the Team, Elimination, King of the Hill and Quidditch, and the LED on the remote-control craft and the controllers is utilized to display game play information to users for the multiplayer team game.

In some embodiments, the gaming system includes a battery-powered handheld gun that includes at least an infrared transmitter configured to communicate game play information to at least the remote control craft via the infrared (IR) communication protocol.

In some embodiments, the remote control craft are flying hovering craft and the controllers are handheld controllers that are configured to communicate at least some control signals via the RF communication protocol in response to sensed orientation of the handheld controller.

In some embodiments, the present invention provides a method for implementing a three-dimensional gaming system that enables game play of among remote-control craft. In some embodiments, the method includes, selectively pairing each of at least four remote-control craft with a particular controller via a radio-frequency (RF) communication protocol implemented between the corresponding controller and the remote-control craft based on a pair identification information contained in the RF communication protocol, selectively assigning at least two sets of the particular selectable pairs of the controller and the remote-control craft to a different team for purposes of playing multiplayer team games based on a team identification information in the RF communication protocol, causing the corresponding controller of the particular selectable pair of the controller and the remote-control craft to communicate at least craft control communications and game-play information between the particular selectable pair via the RF communication protocol, the game-play information including control information based on activations of a trigger mechanism on the controller, and causing the corresponding remote-control craft of the particular selectable pair of the controller and the remote-control craft to use the game-play information, the pair identification information and the team identification information in controlling and communicating game-play information among the remote-control craft via an infrared (IR) communication protocol implemented via an infrared transmitter and receiver on the corresponding remote-control craft.

Some embodiments of the method provide at least one additional game accessory element that is equipped with an infrared transmitter and receiver to communicate via the IR communication protocol with at least a selected set of the remote-control craft.

In some embodiments of the method, the at least one additional accessory element further transmits communications via the RF communication protocol with at least the selected set of the remote-control craft.

Some embodiments of the method provide a game control application configured to execute on a computing device having an RF communication channel for accessing the RF communication protocol, the game-control application being programmed to dynamically display information from the gaming system related to the multiplayer team games.

In some embodiments of the method, the remote control craft and the controllers each include at least one multi-color LED, and the method further comprises configuring the LED to display a common selectable color that is the same for both the craft and the controller of the particular selectable pair and indicates the team to which the particular selectable pair of the craft and controller are assigned for purposes of playing multiplayer team games.

In some embodiments of the method, the multiplayer team games are selected from the set of: Domination, Capture the Flag, Capture the Team, Elimination, King of the Hill and Quidditch, and wherein configuring the LED on the remote control craft and the controllers includes utilizing the LED to display game play information to users for the multiplayer team game.

In some embodiments the method, the remote-control craft are flying hovering craft and the controllers are handheld controllers that are configured to communicate at least some control signals via the RF communication protocol in response to sensed orientation of the handheld controller.

Some embodiments of the method provide a battery-powered handheld gun that includes at least an infrared transmitter and is configured to communicate game play information to at least the remote control craft via the infrared (IR) communication protocol.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

The entire content of each and all patents, patent applications, articles and additional references, mentioned herein, are respectively incorporated herein by reference.

The art described is not intended to constitute an admission that any patent, publication or other information referred to herein is "prior art" with respect to this invention, unless specifically designated as such. In addition, any description of the art should not be construed to mean that a search has been made or that no other pertinent information as defined in 37 C.F.R. §1.56(a) exists.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

What is claimed is:

1. A three-dimensional gaming system that enables game play among remote-control craft, the gaming system comprising:
    a game-control application configured to execute on a computing device having a radio-frequency (RF) communication channel for accessing an RF communication protocol, the game-control application being programmed to dynamically display information from the gaming system related to the multiplayer team games;
    at least four remote-control craft and at least four controllers, each craft selectively uniquely paired with and controlled by a different corresponding one of the at least four controllers via the RF communication protocol implemented between the corresponding controller and the remote-control craft that transmits at least craft control communications between a particular selectable pair of the controller and the remote-control craft based on a pair identification information contained in the RF communication protocol;
    each of the at least four controllers operative to control game-play information among at least the remote-control craft and the game-control application via a communication protocol implemented via a transmitter and receiver on the corresponding remote-control craft, wherein at least two sets of at least two of the particular selectable pairs are also selectively assigned to a different one of a plurality of teams for purposes of playing multiplayer team games based on a team identification information in the RF communication protocol.

2. The gaming system of claim 1, further comprising:
    at least one additional game accessory element that is equipped with an infrared transmitter and receiver to communicate via the IR communication protocol with at least one of the remote-control craft.

3. The gaming system of claim 2, wherein the at least one additional accessory element is further equipped to transmit communications via the RF communication protocol.

4. The gaming system of claim 2, wherein the at least one additional accessory element is selected from the set consisting of a target puck, a reloading station, or any combination thereof.

5. The gaming system of claim 2, wherein the remote-control craft are flying craft and the accessory elements are non-flying objects.

6. The gaming system of claim 2, wherein the RF communication channel is a short-range wireless radio-frequency communication channel between the computing device and at least one accessory element.

7. The gaming system of claim 2, wherein the RF communication channel is RF communication circuitry on a USB dongle configured to utilize the RF communication protocol.

8. The gaming system of claim 1, wherein the remote control craft are flying hovering craft and the controllers are handheld controllers that are configured to communicate at least some control signals via the RF communication protocol in response to sensed orientation of the handheld controller.

9. The gaming system of claim 1, wherein the remote-control craft and the controllers each include at least one multi-color LED configured to display a common selectable color that is the same for both the craft and the controller of the particular selectable pair and indicates the team to which the particular selectable pair of the craft and controller are assigned for purposes of playing multiplayer team games.

10. The gaming system of claim 9, wherein the multiplayer team games are selected from the set of: Domination, Capture the Flag, Capture the Team, Elimination, King of the Hill and a game in which a plurality of users control their respective remote-control craft to chase and shoot at a designated target remote-control craft, and wherein the LED on the remote-control craft and the controllers is utilized to display game play information to users for the multiplayer team game.

11. The gaming system of claim 1, further comprising a battery-powered handheld gun that includes at least an infrared transmitter configured to communicate game play information to at least the remote control craft via the infrared (IR) communication protocol.

12. A method for implementing a three-dimensional gaming system that enables game play among remote-control craft, the method comprising:
    executing a game-control application on a computing device having a radio-frequency (RF) communication channel for accessing an RF communication protocol, the game-control application being programmed to dynamically display information from the gaming system related to the multiplayer team games;
    using at least one of a plurality of four controllers, selectively uniquely pairing, at least in part via a computing device processor and computing device memory that are located in the at least one of the plurality of four controllers, each of at least four remote-control craft with a different particular respective one of the plurality of four controllers via a radio-frequency (RF) communication protocol implemented between the corresponding respective controller and its respective remote-control craft based on a pair identification information contained in the RF communication protocol;
    selectively assigning at least two sets of the particular selectable pairs of the controller and the remote-control craft to a different one of a plurality of teams for purposes of playing multiplayer team games based on a team identification information in the RF communication protocol;

using the corresponding controller of the particular selectable pair of the controller and the remote-control craft to communicate at least craft control communications and game-play information between the particular selectable pair via the RF communication protocol, the game-play information including control information based on activations of a trigger mechanism on the controller; and using circuitry of the corresponding remote-control craft of the particular selectable pair of the controller and the remote-control craft to use the game-play information, the pair identification information and the team identification information in controlling and communicating game-play information among the remote-control craft via a communication protocol implemented via a transmitter and receiver on the corresponding remote-control craft.

13. The method of claim 12, wherein the remote-control craft are flying hovering craft and the controllers are handheld controllers that are configured to communicate at least some control signals via the RF communication protocol in response to sensed orientation of the handheld controller.

14. The method of claim 12, further comprising providing at least one additional game accessory element that is equipped with an infrared transmitter and receiver to communicate via the IR communication protocol with at least a selected set of the remote-control craft.

15. The method of claim 14, wherein the at least one additional accessory element further transmits communications via the RF communication protocol with at least the selected set of the remote-control craft.

16. The method of claim 12, further comprising providing a game control application configured to execute on a computing device having an RF communication channel for accessing the RF communication protocol, the game-control application being programmed to dynamically display information from the gaming system related to the multiplayer team games.

17. The method of claim 12, wherein the remote control craft and the controllers each include at least one multi-color LED, and the method further comprises configuring the LED to display a common selectable color that is the same for both the craft and the controller of the particular selectable pair and indicates the team to which the particular selectable pair of the craft and controller are assigned for purposes of playing multiplayer team games.

18. The method of claim 17, wherein the multiplayer team games are selected from the set of: Domination, Capture the Flag, Capture the Team, Elimination, King of the Hill and a game in which a plurality of users control their respective remote-control craft to chase and shoot at a designated target remote-control craft, and wherein configuring the LED on the remote control craft and the controllers includes utilizing the LED to display game play information to users for the multiplayer team game.

19. The method of claim 17, further comprising providing a battery-powered handheld gun that includes at least an infrared transmitter and is configured to communicate game play information to at least the remote control craft via the infrared (IR) communication protocol.

20. A non-transitory computer readable medium having instructions stored thereon for executing a method for implementing a three-dimensional gaming system that enables game play among remote-control craft, the medium comprising:

a game-control application on a computing device having a radio-frequency (RF) communication channel for accessing an RF communication protocol, the game-control application being programmed to dynamically display information from the gaming system related to the multiplayer team games;

instructions for executing the game-control application;

instructions for executing selectively uniquely pairing, at least in part via a computing device processor and computing device memory that are located in the at least one of the plurality of four controllers, each of at least four remote-control craft with a different particular respective one of the plurality of four controllers via a radio-frequency (RF) communication protocol implemented between the corresponding respective controller and its respective remote-control craft based on a pair identification information contained in the RF communication protocol;

instructions for executing selectively assigning at least two sets of the particular selectable pairs of the controller and the remote-control craft to a different one of a plurality of teams for purposes of playing multiplayer team games based on a team identification information in the RF communication protocol;

instructions for communicating at least craft control communications and game-play information between the particular selectable pair via the RF communication protocol, the game-play information including control information based on activations of a trigger mechanism on the controller; and instructions for controlling circuitry of the corresponding remote-control craft of the particular selectable pair of the controller and the remote-control craft to use the game-play information, the pair identification information and the team identification information in controlling and communicating game-play information among the remote-control craft via a communication protocol implemented via a transmitter and receiver on the corresponding remote-control craft.

* * * * *

UNITED STATES PATENT AND TRADEMARK OFFICE
CERTIFICATE OF CORRECTION

PATENT NO. : 9,630,100 B2  
APPLICATION NO. : 14/691412  
DATED : April 25, 2017  
INVENTOR(S) : John Paul Condon et al.

Page 1 of 1

It is certified that error appears in the above-identified patent and that said Letters Patent is hereby corrected as shown below:

On the Title Page

In the title and in the Specification, Column 1, as the final word of the title:
Delete "CARPET" and insert -- CRAFT -- therefor.

Signed and Sealed this
Twentieth Day of June, 2017

Joseph Matal
*Performing the Functions and Duties of the
Under Secretary of Commerce for Intellectual Property and
Director of the United States Patent and Trademark Office*